US007914072B2

(12) United States Patent
Queener et al.

(10) Patent No.: US 7,914,072 B2
(45) Date of Patent: Mar. 29, 2011

(54) MOON ROOF FRAME MODULE FOR REINFORCEMENT OF AUTOMOTIVE ROOF

(75) Inventors: Lawrence A. Queener, Pinckney, MI (US); Hikmat F. Mahmood, Bloomfield Hills, MI (US); Ramakrishna P. Koganti, Canton, MI (US); Jason S. Balzer, Commerce, MI (US); James W. Lowe, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 12/182,049

(22) Filed: Jul. 29, 2008

(65) Prior Publication Data

US 2010/0026054 A1 Feb. 4, 2010

(51) Int. Cl.
*B60J 7/00* (2006.01)

(52) U.S. Cl. .............. 296/210; 296/216.01; 296/216.07; 296/216.08

(58) Field of Classification Search ............. 296/216.01, 296/216.06–216.08, 210
See application file for complete search history.

(56) References Cited

U.S. PATENT DOCUMENTS 3,016,263 A * 1/1962 Rehmann ................. 296/216.04
4,328,990 A * 5/1982 Yoshida ......................... 296/222
4,838,607 A * 6/1989 Mizuma et al. ............... 296/219
6,409,258 B1 * 6/2002 Grimm et al. ............ 296/216.08
6,431,644 B1 8/2002 Nagashima ................... 296/223
6,786,538 B1 9/2004 Turk ........................ 296/216.01
6,846,040 B2 1/2005 De Waal .................. 296/216.07
6,877,796 B2 * 4/2005 Kimura .................... 296/187.13
7,320,498 B2 * 1/2008 Boehm et al. ............ 296/216.06

* cited by examiner

*Primary Examiner* — Dennis H Pedder
(74) *Attorney, Agent, or Firm* — Frederick Owens, Esq.; Miller Law Group, PLLC

(57) ABSTRACT

A moon roof frame module is sized to span between the laterally spaced roof side rails of an automotive roof frame structure and is welded to the opposing roof side rails to be integrated into the roof frame structure. As a result, the moon roof assembly serves as a load path member to reinforce the automotive roof structure. The integrated moon roof frame module will receive roll over forces and increase the strength of the roof structure of an automotive vehicle. The moon roof frame module includes a U-shaped roof panel that is welded to the opposing roof side rails and provides a reinforcing cross member located forwardly of the moon roof opening. A second cross member positioned rearwardly of the moon roof opening increases rigidity of the reinforcing moon roof frame module.

19 Claims, 4 Drawing Sheets

MOON ROOF FRAME MODULE FOR REINFORCEMENT OF AUTOMOTIVE ROOF

FIELD OF THE INVENTION

This invention relates to the roof structure of an automotive vehicle and, more particularly, to a moon roof frame module that can be integrated into the roof frame structure to reinforce the automotive roof to withstand roll over conditions.

BACKGROUND OF THE INVENTION

The roof frame structure of an automotive vehicle roof generally includes a pair of roof side rails extending, respectively, along the transversely spaced sides of the roof with frame structure such as headers and roof bows spanning transversely between the roof side rails to support the roof structure. The roof side rails are connected to the vertical frame members of the vehicle body, commonly referred to as pillars, such as the A-pillar at the front of the vehicle passenger compartment and the B-pillar which can be at the center or at the rear of the passenger compartment depending on the configuration of the vehicle and the number of doors into the passenger compartment and the manner in which they are mounted.

The roof frame structure can provide support for a moon roof module that is typically dropped into the roof structure and attached to the roof headers or roof bows by conventional devices, including hemming, adhesives, and fasteners. Current moon roof modules will use a combination of hemming or fasteners with adhesives to join the moon roof module to the roof panel, adhesive being used as a secondary joining process between the roof panel and the moon roof panel. Such conventional moon structure does not provide any support or reinforcement of the roof structure in case of a roll over event, as the moon roof module is not intended to provide any structural crash function. Current guidelines for resisting forces in roll over events are becoming more difficult to meet. Accordingly, the strength of the roof structure must be increased to meet these requirements.

An example of a drop-in style of moon roof modules is shown in U.S. Pat. No. 6,431,644, granted to Youji Nagashima, et al on Aug. 13, 2002, wherein a pair of laterally spaced guide rails provides support for the moving panel that opens and closes the moon roof opening. In U.S. Pat. No. 6,786,538, granted on Sep. 7, 2004, to Daniel Turk, et al. the roof structure around a moon roof is reinforced by support roof structure that is installed below the upper roof panel to strengthen the upper roof portion. The support roof structure in the Turk patent is equipped with a sunroof and has side rails running along the side edges of the moon roof panel for attachment to the panel enclosure. The moon roof structure in U.S. Pat. No. 6,846,040, issued on Jan. 25, 2005, to Martin De Waal, utilizes a reinforcement sheet attached to the roof frame to increase the stability of the vehicle roof. Support tubes are attached to the roof frame to connect the roof frame to the side member.

None of these prior art references utilize the moon roof module to help withstand the crushing forces applied to the roof structure during a roll over event. Accordingly, it would be desirable to provide a moon roof module that can be attached to the roof frame structure to improve the strength of the vehicle roof and serve as a reinforcement to the roof structure.

SUMMARY OF THE INVENTION

It is an object of this invention to overcome the aforementioned disadvantages of the known prior art by providing a moon roof frame module that will integrate with the roof frame structure to increase roof strength to resist roll over forces.

It is another object of this invention to provide a moon roof frame module that will reinforce the roof structure of an automotive vehicle.

It is a feature of this invention that the moon roof frame module spans between the roof side rails.

It is an advantage of this invention that the moon roof frame module improves roof strength in as related to roll over events.

It is another advantage of this invention that the moon roof assembly is integrated into the roof frame structure to provide a load transfer path to the moon roof frame module.

It is another feature of this invention that the moon roof frame module serves as a load path member.

It is still another feature of this invention that the moon roof frame module is welded to the roof side rails to integrate the moon roof assembly into the roof frame structure.

It is yet another object of this invention to provide a moon roof frame module that can be integrated into the roof frame structure, which is durable in construction, inexpensive of manufacture, carefree of maintenance, facile in assemblage, and simple and effective in use.

These and other objects, features and advantages are accomplished according to the instant invention by providing moon roof frame module that is sized to span between the laterally spaced roof side rails of an automotive roof frame structure and is welded to the opposing roof side rails to be integrated into the roof frame structure. As a result, the moon roof assembly serves as a load path member to reinforce the automotive roof structure. The integrated moon roof assembly will receive roll over forces and increase the strength of the roof structure of an automotive vehicle. The moon roof frame module includes a U-shaped roof panel that is welded to the opposing roof side rails and provides a reinforcing cross member located forwardly of the moon roof opening. A second cross member positioned rearwardly of the moon roof opening increases rigidity of the reinforcing moon roof frame module.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
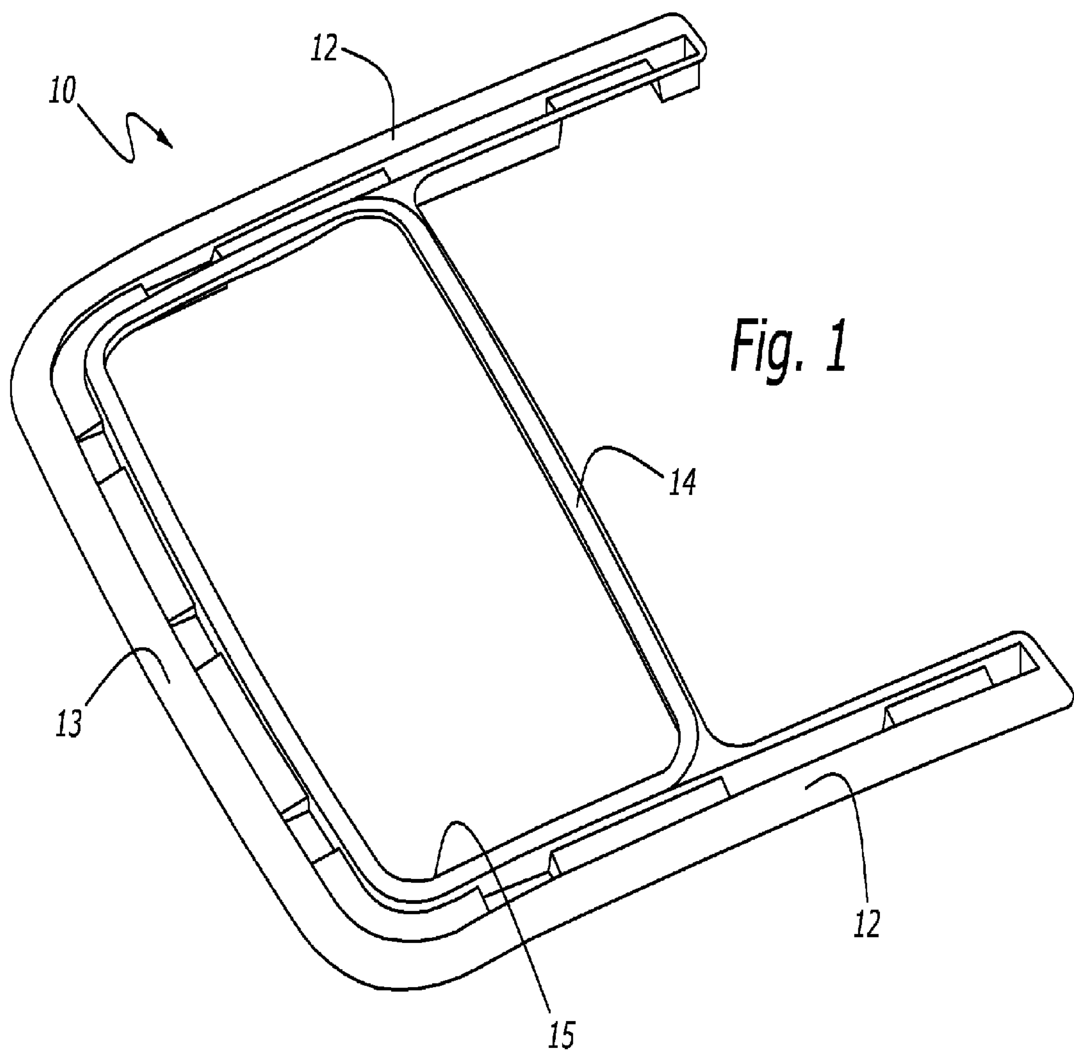
FIG. 1 is a perspective view of a moon roof frame module incorporating the principles of the instant invention.
Figure 2:
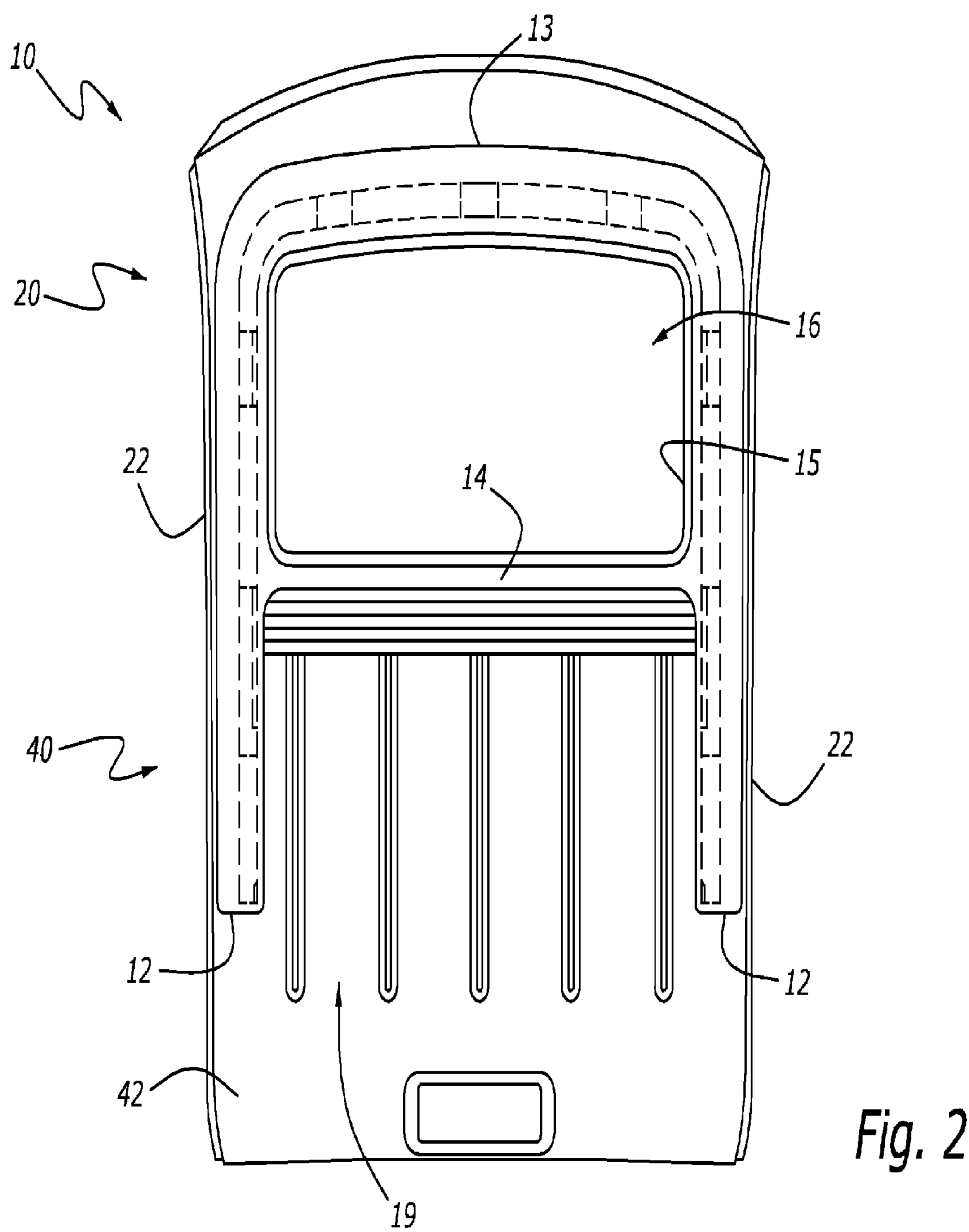
FIG. 2 is a top plan view of the automotive roof structure with the moon roof frame module integrated into the roof frame structure.
Figure 3:
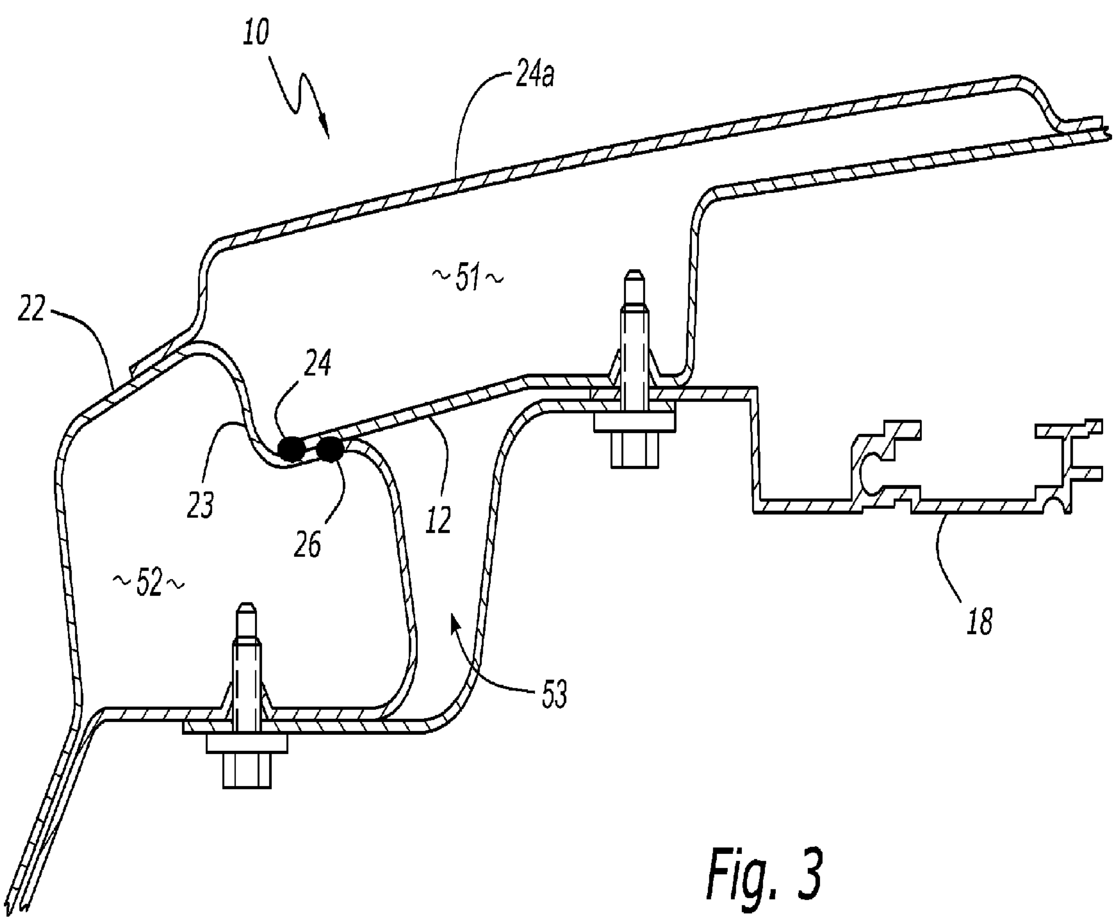
FIG. 3 is a partial cross-sectional view of the integrated moon roof assembly showing the integration of the primary moon roof panel into the roof side rail.
Figure 4:
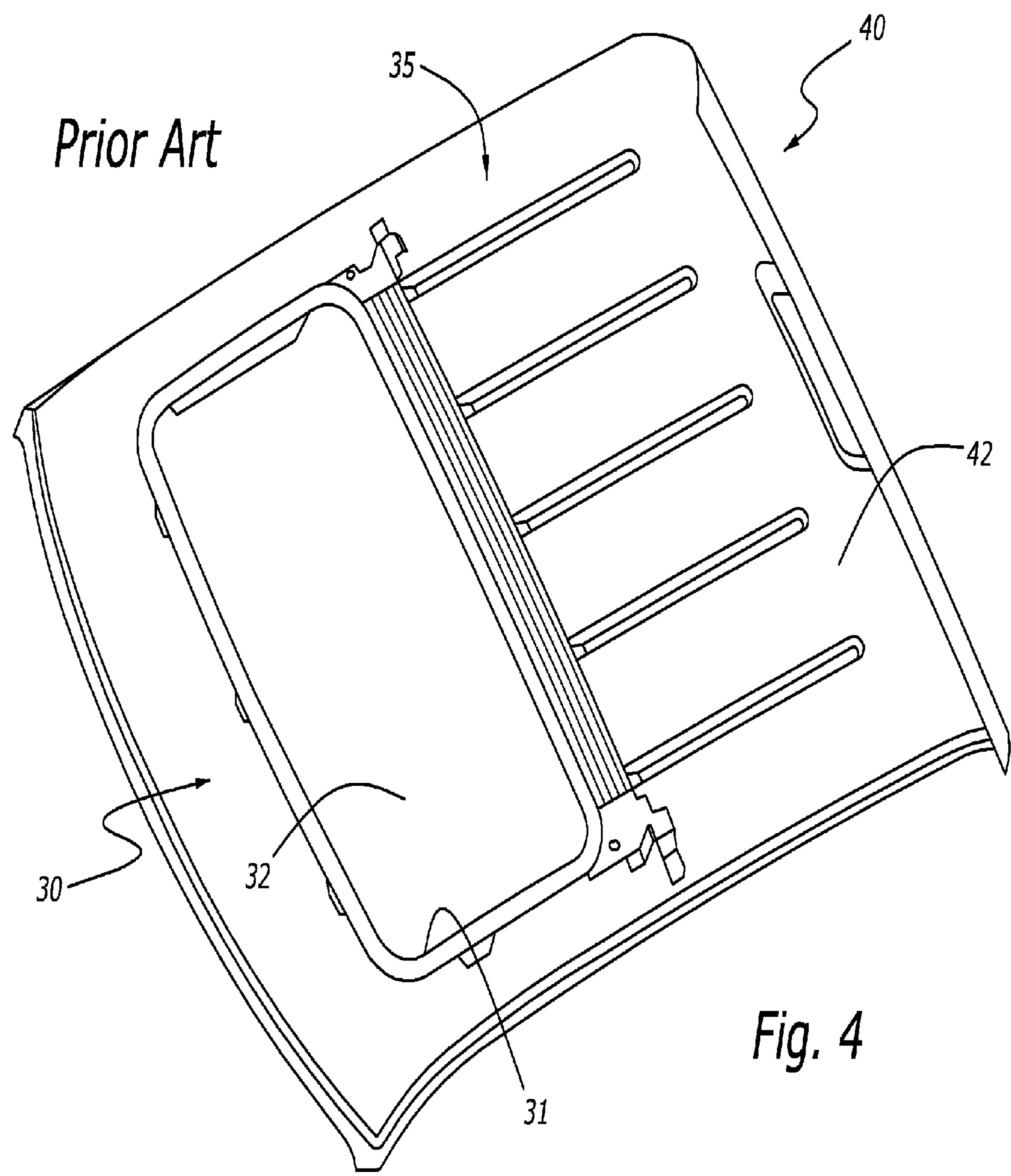
FIG. 4 is a typical prior art moon roof frame module installed into an automotive roof structure.

Referring to FIGS. 1-3, a moon roof frame module incorporating the principles of the instant invention can best be seen. The typical prior art moon roof module installed into an automotive roof can be seen in FIG. 4. This typical prior art moon roof module 30 is simply dropped into the roof structure 40 to define a moon roof opening 31 in the roof structure 40. The operative components 35 for driving and guiding the movement of the moon roof member 32 are supported underneath the roof member 42 in a conventional manner. The peripheral edges of the moon roof module 30 are hemmed or connected through adhesives to the roof member 42. This typical prior art moon roof module 30 provides no reinforcement to the roof structure 40 and lessens roof strength in resisting the collapse of the roof structure 40 in a roll over event. The moon roof frame module 10 incorporating the principles of the instant invention overcomes these disadvantages of the prior art moon roof modules 30 by providing a moon roof frame module 10 that will reinforce the roof structure 40 and enhance the strength of the roof structure 40 to resist roll over forces.

As is best seen in FIGS. 1 and 2, the moon roof frame module 10 is formed in a U-shaped configuration with moon roof side panels 12 on opposing lateral sides thereof and an integral forward cross member 13 that forms the bight portion of the U-shaped configuration of the moon roof frame module 10. Preferably, the moon roof side panels 12 and the forward cross member 13 will be formed in a shaped, corrugated configuration to improve the strength of the moon roof side panels 12 and the forward cross member 13. A second cross member 14 spans between the two laterally opposing moon roof side panels 12 to define with the forward cross member 12 and the forward portions of the moon roof side panels 12 the moon roof opening 15. As with the prior art moon roof modules 30, the operative components 19 for powering and guiding the movement of the moon roof member 16 are conventional and supported beneath the roof member 42 of the vehicle in a conventional manner.

As is best seen in FIGS. 2 and 3, the moon roof side panels 12 are joined to the corresponding, opposing roof side rails 22 forming part of an automotive roof frame structure 20. Preferably, the roof side rail 22 will be formed with a shaped mounting surface 23 that will mate with the moon roof side panel 12 to allow the moon roof side panel 12 to be affixed to the roof side rail 22 and be integrated therewith. Preferably, the moon roof side panel 12 is welded, such as by laser welding, as represented by the welds 24, 26, to the mounting surface 23 of the roof side rail 12 so as to be fully secured thereto. Alternatively, or even in addition to the laser welding, the moon roof side panel 12 can be affixed to the roof side rail 22 by adhesives. In addition, the forward cross member 13 can be welded to and integrated with the front header 13*a* of the roof frame structure 20, as reflected by the exemplary welds 24, 26 shown for the side rails 22 and front header 13*a* in FIGS. 2 and 3. In addition to second cross member 14 defining the moon roof opening 15, the second cross member 14 serves to keep the laterally spaced moon roof panels 12 spaced properly, particularly when the vehicle undergoes a roll over event. The moon roof frame module 10 serves to reinforce the roof frame structure 20 in addition to the normal cross bows and front and rear header members (not shown). The moon roof frame module 10 is finished with the application of appropriate trim members 18.

As best seen in FIG. 3, the joining of the moon roof side panels 12 to the corresponding roof side rails 22 creates in combination with the trim member 18 a configuration that defines three closed beam sections at each longitudinal sides of the roof frame structure 20. The first closed beam section 51 is formed with the shaped moon roof side panel 12 on the underside of the closed beam section 51 and an upper cap member 24*a* to enclosed the first closed beam section 51. The second closed beam section 52 is formed by the shaped roof side rail 22 and is located outboard of and below the first closed beam section 51. The third closed beam section 53 is located inboard of the second closed beam section 52 and below the first closed beam section 53 and is formed on the underside and inboard side by the trim member 18, on the outboard side by the roof side rail 22 and on the upper side by the moon roof side panel 12. Thus, the first closed beam section 51 is formed by the moon roof module 10, the second closed beam section 52 is formed by the roof side rail 22, and the third closed beam section 53 is formed by the trim member 18 with the underside of the moon roof frame module 10 and the interior side of the roof side rail 22. This three closed beam section configuration for the longitudinal sides of the roof frame structure 20 incorporates the moon roof frame module 10 to reinforce the roof structure 40 and enhance the strength of the roof structure 40 to resist roll over forces.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive vehicle having a roof frame structure including a pair of laterally spaced, longitudinally extending roof side rail members and a transversely extending header interconnecting the roof side rail members, the improvement comprising:

a moon roof frame module having a pair of transversely spaced, longitudinally extending moon roof side panels and a forward transverse cross member extending between the moon roof side panels, each of the moon roof side panels being secured to a corresponding roof side rail member to be integrated into the roof frame structure, the moon roof frame module defining a moon roof opening, the moon roof side panels extending rearwardly from the forward cross member to project generally linearly rearwardly of the moon roof opening to reinforce the roof frame structure rearwardly of the moon roof opening; and said moon roof frame module being connected to said roof side rail members to create along each opposing longitudinal side of said roof frame structure a three closed beam section configuration, including a first closed beam section formed by said moon roof frame module, a second closed beam section formed by said roof side rail member, and a third closed beam section formed by a trim member spaced from said moon roof side panel and the roof side rail member said first closed beam section closed by an upper surface of said second closed beam section.

2. The automotive vehicle of claim 1 wherein the moon roof frame module includes a second cross member spaced rearwardly of the forward cross member to define the moon roof opening between the forward and second cross members and between the transversely opposing moon roof side frame members, the moon roof side panels extending rearwardly of the second cross member.

3. The automotive vehicle of claim 2 wherein the moon roof side panels and the forward cross member are formed in a corrugated configuration.

4. The automotive vehicle of claim 2 wherein each of the roof side rail members are formed with a shaped mounting surface to receive the moon roof side panels for integration therewith.

5. The automotive vehicle of claim 4 wherein the moon roof side panels are welded to the roof side rails members.

6. The automotive vehicle of claim 4 wherein the moon roof side panels are secured to the roof side rail members by adhesives.

7. The automotive vehicle of claim 4 wherein the forward cross member is welded to the transversely extending header.

8. A moon roof frame module for an automotive vehicle having a roof frame structure including a pair of transversely spaced roof side rail members and a front header member interconnecting the roof side rail members, comprising:

a pair of longitudinally extending moon roof side panels secured to the roof side rail members, respectively, so as to be integrated into the roof frame structure, the moon roof side panels forming three closed beam sections along each longitudinal side of the roof frame structure with a first closed beam section being formed by said moon roof frame module, a second closed beam section being formed by said roof side rail member, and a third closed beam section being formed by a trim member spaced from said moon roof side panel and the roof side rail member said first closed beam section closed by an upper surface of said second closed beam section; and a forward cross member interconnecting forward ends of the moon roof side panels to create a U-shaped moon roof frame module configuration to support a moon roof assembly, the moon roof side panels extending rearwardly of the moon roof assembly and being secured to the roof frame structure so as to reinforce the roof frame structure rearwardly of the moon roof assembly.

9. The moon roof frame module of claim 8 wherein the forward cross member is secured to the front header member of the roof frame structure to be integrated therewith.

10. The moon roof frame module of claim 9 wherein the moon roof side panels are welded to the roof side rails members and the front cross member is welded to the front header member to be integrated therewith.

11. The moon roof frame module of claim 10 wherein each of the roof side rail members is shaped to receive the moon roof side panels for integration thereof into the roof frame structure.

12. The moon roof frame module of claim 11 wherein the moon roof side panels and the forward cross member are formed in a corrugated configuration.

13. A roof frame structure for an automotive vehicle comprising:

a pair of generally longitudinally extending, transversely spaced roof side rail members;

a front header member extending between forward portions of the roof side rail members;

a moon roof frame module extending between the roof side rail members rearwardly of the front header member, the moon roof frame module including a pair of transversely spaced moon roof side panels, an integral forward cross member and a second cross member spaced rearwardly of the forward cross member, the moon roof side panels being affixed to the corresponding roof side rail members and extending generally linearly rearwardly of the second cross member to reinforce the roof frame structure, the moon roof side panels forming a three closed beam section configuration, including a first closed beam section formed by said moon roof frame module, a second closed beam section formed by said roof side rail member, and a third closed beam section formed by a trim member spaced from said moon roof side panel and the roof side rail member said first closed beam section closed by an upper surface of said second closed beam section.

14. The roof frame structure of claim 13 wherein the forward cross member interconnects forward ends of the moon roof side panels to form a U-shaped configuration.

15. The roof frame structure of claim 14 wherein the forward cross member is affixed to the front header member.

16. The roof frame structure of claim 15 wherein each of the roof side rail members is shaped to receive the moon roof side panels for integration thereof into the roof frame structure.

17. The roof frame structure of claim 16 wherein the moon roof side panels are welded to the roof side rails members and the front cross member is welded to the front header member to be integrated therewith.

18. The roof frame structure of claim 17 wherein the moon roof side panels and the forward cross member are formed in a corrugated configuration.

19. The roof frame structure of claim 16 wherein the moon roof side panels are secured to the roof side rail members by adhesives.

* * * * *